United States Patent [19]

Nelson

[11] Patent Number: 4,663,118
[45] Date of Patent: May 5, 1987

[54] FLOW CHANNEL TO NOZZLE ATTACHMENT FOR NUCLEAR FUEL ASSEMBLY

[75] Inventor: Harold L. Nelson, San Jose, Calif.

[73] Assignee: General Electric Company, San Jose, Calif.

[21] Appl. No.: 746,733

[22] Filed: Jun. 20, 1985

[51] Int. Cl.⁴ .............................................. G21C 3/32
[52] U.S. Cl. .................................. 376/445; 376/446
[58] Field of Search ............... 376/440, 445, 446, 448, 376/352, 434; 403/355, 361

[56] References Cited

U.S. PATENT DOCUMENTS

| 1,467 | 4/1863 | Perry | 403/355 X |
| 3,697,375 | 10/1972 | Suvanto et al. | 376/440 |
| 3,697,376 | 10/1972 | Mefford et al. | 376/440 |
| 4,338,736 | 7/1982 | Radigan | 403/355 X |
| 4,526,744 | 7/1985 | Borrman et al. | 376/446 X |

FOREIGN PATENT DOCUMENTS 7405623 10/1985 Netherlands ...................... 376/440

Primary Examiner—Deborah L. Kyle
Assistant Examiner—John S. Maples
Attorney, Agent, or Firm—Ivor J. James, Jr.; Raymond G. Simkins

[57] ABSTRACT

A flow channel-to-nozzle attachment for a nuclear fuel assembly wherein the flow channel and nozzle are formed of material having different thermal coefficients of expansion, the attachment comprising tapered bars secured to the lower inner ends of the channel which bars are fitted into similarly tapered grooves in the adjacent outer surfaces of the nozzle, the angle of taper being selected such that the tapered bars move more or less deeply into the grooves in the nozzle with temperature changes without bending or stressing the lower end of the channel.

7 Claims, 3 Drawing Figures

FLOW CHANNEL TO NOZZLE ATTACHMENT FOR NUCLEAR FUEL ASSEMBLY

BACKGROUND

Nuclear power reactors are well known and are discussed, for example, by M. M. El-Wakil in "Nuclear Power Engineering", McGraw-Hill Book Company, Inc., 1962.

In a known type of nuclear power reactor, for example, as used in the Dresden Nuclear Power Station near Chicago, Ill., the reactor core is of the heterogenous type. In such reactors the nuclear fuel comprises elongated rods formed of sealed cladding tubes of suitable material, such as a zirconium alloy, containing uranium oxide and/or plutonium oxide as the nuclear fuel, for example, as shown in U.S. Pat. No. 3,365,371. A number of such fuel rods are grouped together and contained in an open-ended tubular flow channel to form a separately removable fuel assembly or bundle. A sufficient number of fuel assemblies are arranged in a matrix, approximating a right circular cylinder, to form the nuclear reactor core capable of self-sustained fission reaction. The core is submerged in a fluid, such as light water, which serves both as a coolant and as a neutron moderator.

A well-known and widely used type of fuel assembly is shown by C. R. Mefford et al in U.S. Pat. No. 3,697,376. Such a fuel assembly is formed by an array of spaced fuel rods supported between upper and lower tie plates, the rods being several feet in length, on the order of one-half inch in diameter and spaced from one another by a fraction of an inch.

As shown in U.S. Pat. No. 3,697,376, the lower tie plate is formed integrally with a tapered nose piece or nozzle which engages a fuel assembly support socket of the core support structure of the nuclear reactor. The nose piece is formed with openings for receiving pressurized fluid coolant and directing it upward past the fuel rods.

To contain the coolant flow, the fuel assembly is surrounded by an open- ended coolant flow channel. The lower open end of the flow channel is an unrestrained slip fit over the lower tie plate/nozzle which results in the problem of control of coolant leakage addressed in U.S. Pat. No. 3,697,376.

Other fuel assembly arrangements are known, such as shown by Suvanto et al in U.S. Pat. No. 3,697,375, wherein the lower tie plate and the nozzle are formed as separate pieces and the lower end of the flow channel is permanently attached to the nozzle. This arrangement solves the coolant leakage problem and can provide other advantages as discussed in U.S. Pat. No. 3,697,375.

The flow channel typically is formed of a zirconium alloy (to minimize neutron absorption) while the nozzle typically is formed of stainless steel. Thus welding of the flow channel to the nozzle as a method of attachment is not practical.

Therefore, attachment of the flow channel to the nozzle has been accomplished by the use of rivets or screws as shown and described in U.S. Pat. No. 3,697,375. However, such attachment by rivets or screws has not been entirely satisfactory. This is because differential thermal expansion of the parts can result in over-stressing and consequent failure (or at least loosening) of the rivets or screws.

Furthermore, if the flow channel is firmly attached to the nozzle (as with screws or rivets), the greater expansion and contraction of the stainless steel nozzle with changes in temperatures, as compared to the zirconium alloy flow channel, can cause bending and stressing of the lower end of the flow channel.

Therefore, an object of the invention is a channel-to-nozzle attachment which substantially avoids stressing of the parts with differential thermal expansion.

SUMMARY

This and other objects of the invention are achieved by a channel-to-nozzle attachment in the form of tapered attachment bars or blocks (formed of material similar to that of the channel, e.g. zirconium alloy) and secured to the lower inside surfaces of the channels. These attachment bars are fitted into mating tapered grooves in the outside surfaces of the nozzle which the lower end of the channel surrounds, the nozzle being formed of material (e.g. stainless steel) having a different (e.g. higher) thermal coefficient of expansion.

The angle of the mating taper between the attachment bars and the grooves in the nozzle is selected such that the fit between the bars and the grooves is maintained, for temperature changes from room temperature to operating temperature in a nuclear reactor, without bending or stressing of the lower end of the channel.

As the channel, the attachment bars and the nozzle expand with increased temperature, the greater expansion of the nozzle is accommodated simply by movement of the attachment blocks further into the grooves, an initial clearance between the faces of the blocks and the bottoms of the grooves being provided to allow such movement.

DRAWING

The invention is described more specifically hereinafter with reference to the drawing wherein.

DESCRIPTION

Figure 1:
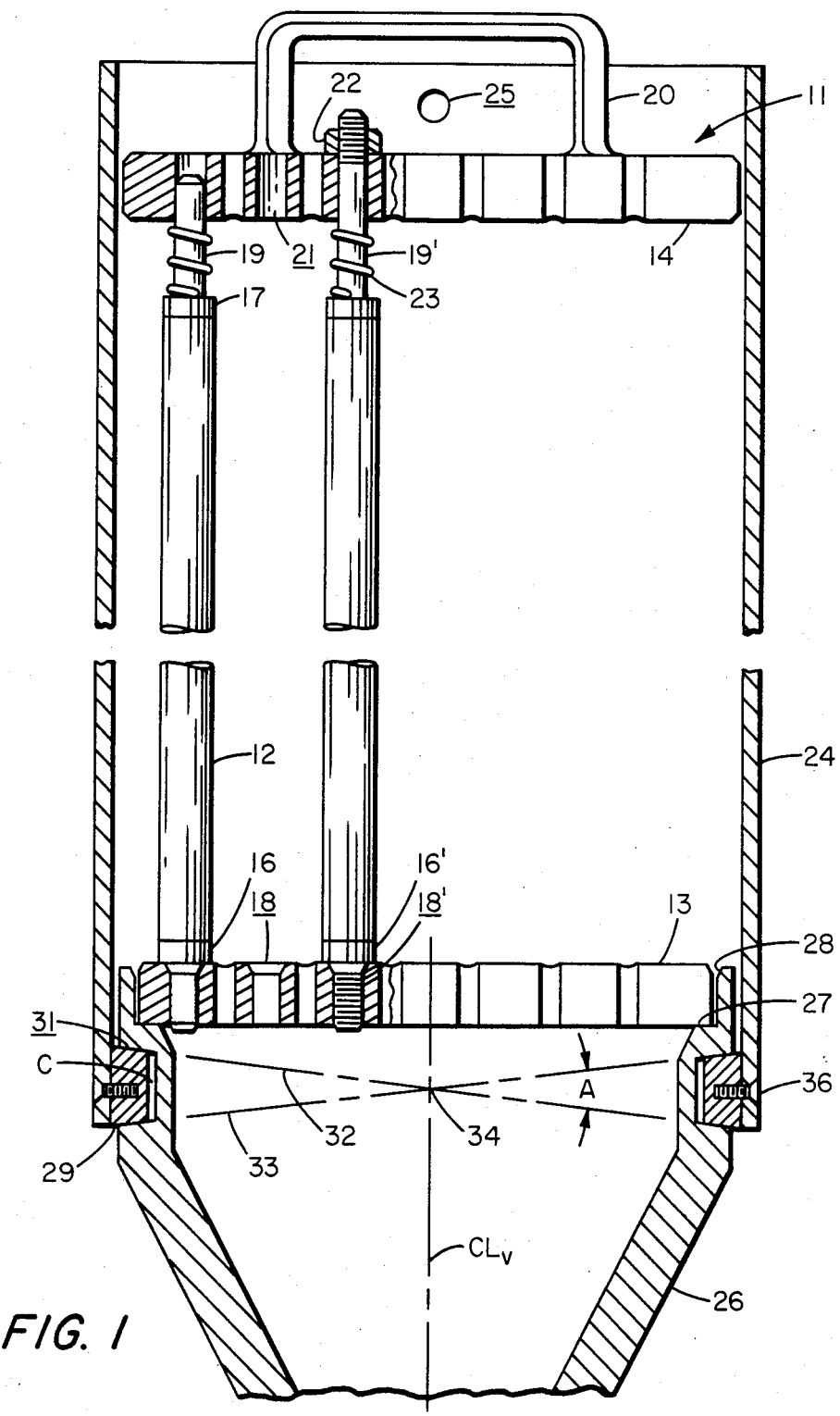
FIG. 1 is a vertical cross section view of a fuel assembly incorporating the attachment of this invention.

As shown in the longitudinal cross section view of FIG. 1, a fuel assembly 11 includes a plurality of elongated fuel rods 12 supported between a lower tie plate 13 and an upper tie plate 14. Although not shown herein, ordinarily a plurality of fuel rod spacers are positioned intermediate the lower and upper tie plates for lateral support of the fuel rods 12.

Each of the fuel rods 12 comprises an elongated tube containing the fissile fuel, usually in the form of pellets, sealed in the tube by lower and upper end plugs 16 and 17. Lower end plugs 16 are formed with a taper for registration and support in support cavities 18 formed in the lower tie plate 13. Upper end plugs 17 are formed with shanks 19 which register with support cavities 21 in the upper tie plate 14.

Several of the support cavities 18 (for example selected ones of the edge or peripheral cavities, such as a cavity 18′) in the lower tie plate 13 are formed with threads to receive fuel rods having threaded lower end plugs, such as an end plug 16′. The shanks 19′ of the upper end plugs of these same fuel rods are elongated to pass through their respective cavities 21 in the upper tie plate 14 and are formed with threads to receive threaded retaining nuts 22. Springs 23 mounted on the shanks 19 urge the upper tie plate 14 upward with respect to the fuel rods 12. In this manner the lower and upper tie plates and the fuel rods are formed into a unitary structure or fuel bundle, the upper tie plate 14 being formed with an upwardly extending handle or bail 20 for handling of the fuel assembly.

The fuel assembly is surrounded by a thin-walled tubular flow channel 24 of substantially square cross section which is open at its upper end. The fuel assembly 11 is a sliding fit in the flow channel 24 so that it readily can be inserted and removed. At its upper end the channel 24 may be formed with holes 25 or the like for handling.

At its bottom end the flow channel 24 is secured, as described in detail hereinafter, to a tapered nose piece 26 adapted to fit into a socket of the lower core support structure (not shown). The lower part (not shown) of nose piece 26 is formed with openings to receive pressurized coolant which is directed by the nose piece 26 and the flow channel 24 upward past the fuel rods 12 (see U.S. Pat. No. 3,697,376).

The nose piece 26 is formed with a shoulder 27 upon which the lower tie plate 13 rests for support of the fuel assembly 11. An upstanding rim 28 surrounds and provides lateral location of the lower tie plate 13.

Typically the flow channel 24 is formed of a material having a low neutron absorption cross section such as an alloy of zirconium while the nose piece 26 is formed of a corrosion resistant iron alloy such as stainless steel. As a practical matter such different materials cannot be welded together.

Previous channel-to-nozzle attachments include attachment of the channel directly to the nozzle with screws or rivets as shown in U.S. Pat. No. 3,697,375. Although simple, the drawback of this arrangement is the possibility that the screws or rivets may loosen or be overstressed and fail because of differential thermal expansion of the flow channel and nozzle due to their different material.

Figure 2:
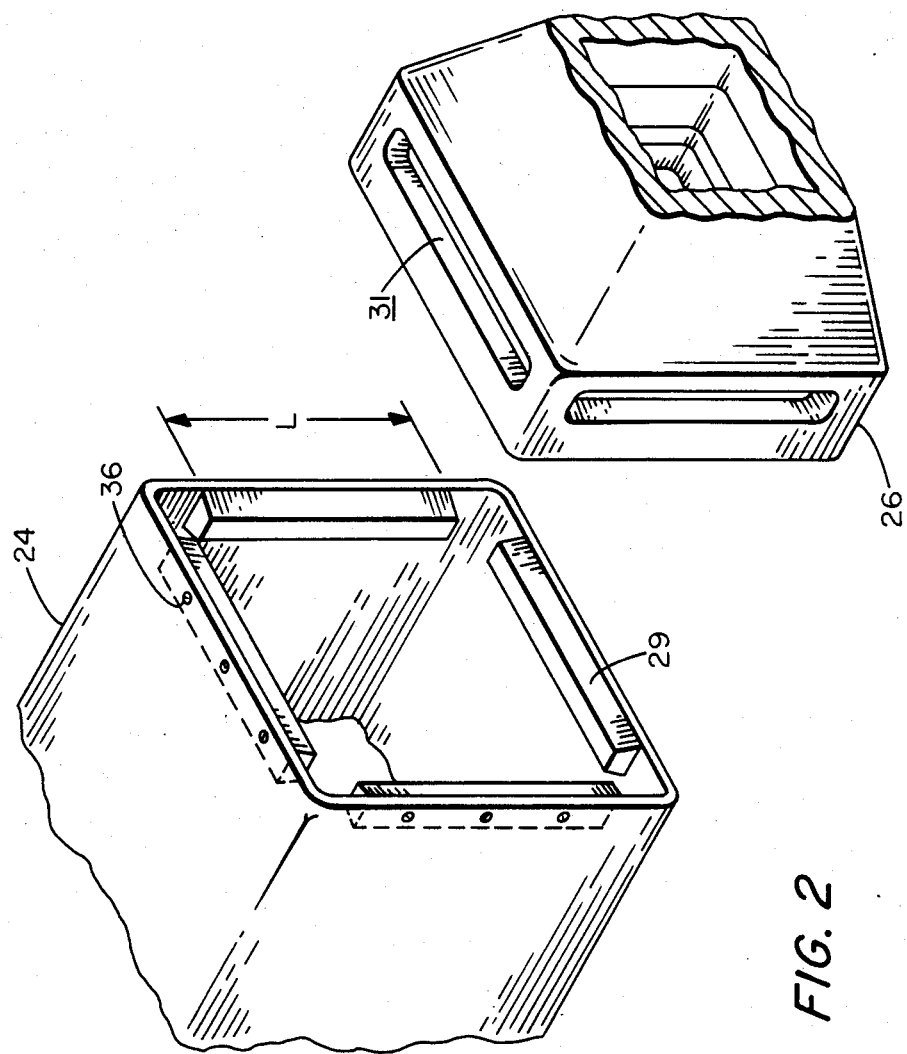
FIG. 2 is an exploded, partial isometric view of the flow channel and nozzle.
Figure 3:
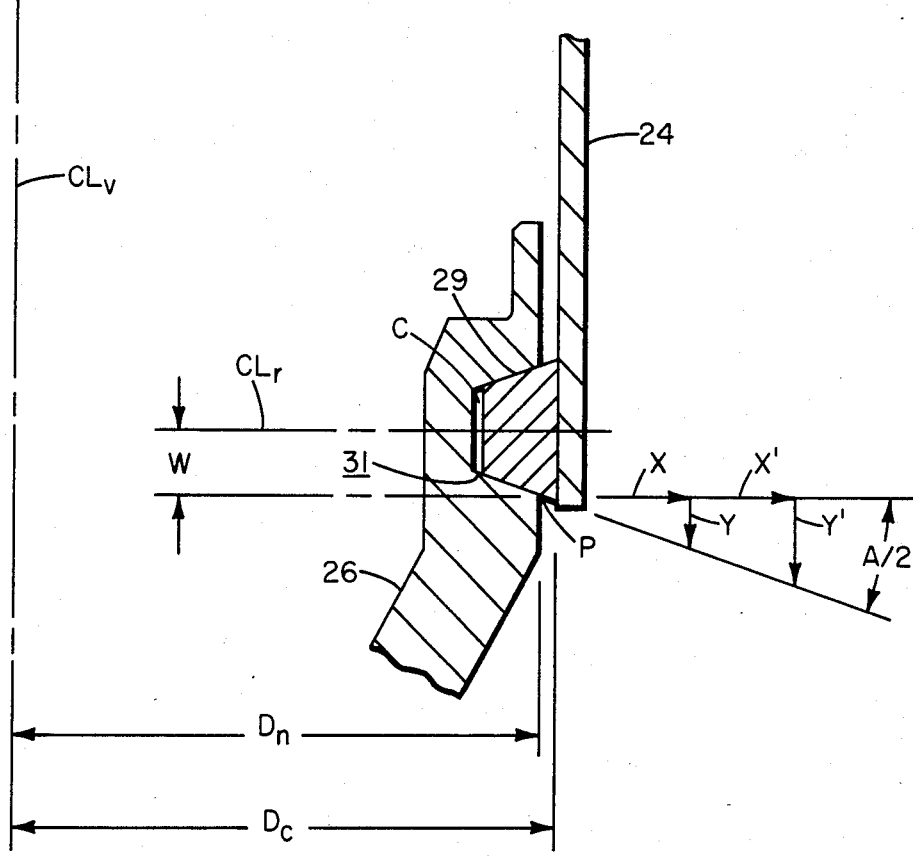
FIG. 3 is a detailed cross section view of the attachment arrangement.

The drawbacks of prior arrangements are avoided by the channel-to-nozzle attachment of the present invention which, as shown in FIGS. 1-3, includes tapered attachment bars 29 secured to the inside lower edges of the channel 24 and fitted into similarly tapered grooves 31 formed in the outside surfaces of the nozzle 26.

The material of the attachment bars 29 is selected to have the same or a very similar thermal coefficient of expansion as the material of the channel 24.

Typically, the channel 24 and the attachment bars 29 are formed of an alloy of zirconium having a thermal coefficient of expansion of about $3.2 \times 10^{-6}$ inch per inch per degree F. while the stainless steel of the nozzle 26 has a substantially greater thermal coefficient of expansion of about $9.45 \times 10^{-6}$ inch per inch per degree F. The temperature range experienced by these parts varies from room temperature to an operating temperature in the reactor core of 600 degrees F. or greater.

As the temperature increases it is evident that the channel 24 expands, i.e. the distance $D_c$ from the center line $CL_v$ to the inside surface of the channel 24 increases. Also the width W of the attachment bars 29 increases. At the same time, the nozzle 26 expands outward a greater amount and the width of the tapered grooves 31 increases a greater amount.

If the channel 24 was firmly attached to the nozzle 26, as in the prior art arrangement, the greater expansion of the nozzle 26 would cause the lower end of the channel 24 to be bent outward thereby stressing this lower end and the attachment screws or rivets.

However, with the illustrated attachment arrangement of the present invention, the tapered attachment bars 29 simply move further into the more rapidly expanding tapered grooves 31, a clearance space C being provided to allow this inward movement.

With proper selection of the angle of taper A the bars 29 can move more or less deeply into the grooves 31 as differential thermal expansion occurs, without any bending of the lower end of the channel 24 and with the bars 29 remaining tightly fitted in the grooves 31.

The optimum angle of taper is illustrated graphically in FIG. 1. A part (the nozzle 26) under thermal expansion will change shape along lines (such as lines 32 and 33) radiating from a center point 34. Thus the grooves 31 change size along the lines 32 and 33 and, therefore, the lines 32 and 33 define the optimum angle of taper A, i.e. the angle between the opposite tapered surfaces of the grooves 31.

In other words, the angle of the taper A is selected such that the tapered upper surface of the groove 31 on one side is in the same plane as the tapered lower surface of the groove 31 on the opposite side of the nozzle 26.

While in the usual case the nozzle 26 has a greater thermal coefficient of expansion than the channel 24 and attachment bars 29, the invention is not so limited and can be used with any combination of different materials.

Mathematically, the optimum angle of taper A can be determined as follows with reference to FIG. 3.

The change in part size due to temperature change dD is given by the following relationship:

$$dD = a\, dT\, D \quad (1)$$

where:
a is the thermal coefficient of expansion.
dT is the temperature range.
D is the length of part.

For any point P on the interface line between the bar 29 and groove 31.

$$(2)\ \tan A/2 = \frac{Y' - Y}{X' - X}$$

where:
X is the radial (lateral from $CL_v$) thermal growth of bar 29.
Y is the axial (vertical from $CL_r$) thermal growth of bar 29.
X' is the radial thermal growth of nozzle 26.
Y' is the axial thermal growth of groove 31.

From relationship (1):

$$X = a_z\, dT\, D_c$$

$$X' = a_s\, dT\, D_n$$

$$Y = a_z\, dT\, W$$

$$Y' = a_s\, dT\, W$$

where:
$a_z$ is the termal coefficient of expansion of the material of the channel 24 and bars 29.

$a_s$ is the thermal coefficient of expansion of the material of the nozzle 26.

$D_c$ is the distance from the vertical centerline $CL_v$ to the inside surface of channel 24.

$D_n$ is the distance from the centerline $CL_v$ to the outside surface of nozzle 26.

W is the distance from radial centerline $CL_r$ to point P.

Substituting in relationship (2):

$$(3) \quad \tan A/2 = \frac{a_s dT\, W - a_z dT\, W}{a_s dT\, D_n - a_z dT\, D_c}$$

Assuming that $D_n$ and $D_c$ are insignificantly different then:

$D_n$ approximates $D_c = D$.

Thus simplifying:

$$(4) \quad \tan A/2 = \frac{dT\, W\, (a_s - a_z)}{dT\, D\, (a_s - a_z)} = \frac{W}{D}$$

In a practical example of the invention for use in a typical BWR (boiling water reactor), W=0.3 inches (7.62 mm) and D=2.63 inches (66.8 mm). Therefore $$\tan A/2 = \frac{0.3}{2.63} \text{ and } A/2 = 6.5 \text{ degrees.}$$

As shown in FIGS. 1 and 2, the attachment bars 29 may be secured to the lower end of the flow channel 24 by flat head screws 36. Alternatively, rivets or welding may be used for this purpose.

As illustrated in FIG. 2, the ends of the grooves 31 are shown rounded since this configuration results from the tapered rotary cutting tool normally used to make the grooves 31. Although not shown, the ends of the attachment bars 29 may be similarly rounded but, in any event, the length L of the bars 29 is selected to be slightly less (depending on manufacturing tolerances) than the length of the grooves 31. This is to allow the bars 29 to find their natural and laterally unrestrained position in the grooves 31.

With reference to FIG. 2, the channel 24 is assembled to the nozzle 26 by placing the attachment bars 29 in the grooves 31, slipping the lower end of the channel 24 over the bars 29 with screw holes in alignment, and then inserting and tightening the screws 36.

Thus what has been described is a flow channel-to-nozzle attachment which remains tightly fitted with temperature changes without stressing the parts.

An additional benefit of this arrangement is excellent control of bypass leakage flow (discussed in U.S. Pat. No. 3,697,376). The only open or leakage flow area is between the nozzle and channel at the four corners and this area tends to remain constant throughout design life.

I claim:

1. In a nuclear fuel assembly including a plurality of fuel rods supported in spaced array upon a lower tie plate, a nozzle adjacent said lower tie plate for receiving a flow of coolant, a tubular flow channel surrounding said array for directing said coolant through said array of said fuel rods, the lower end of said flow channel surrounding the sides of said nozzle, said nozzle being formed of a material having a greater thermal coefficient of expansion than the material of said channel, attachment means for affixing said lower end of said channel to said sides of said nozzle comprising: a plurality of grooves having tapered sides formed in said sides of said nozzle around the periphery thereof; a like plurality of attachment bars formed of a material having a thermal coefficient of expansion similar to that of said channel, each of said bars being fitted in a respective one of said grooves of said nozzle and being formed with tapered sides mated with the tapered sides of the respective groove; and means for securing said bars to the inside surfaces of the lower end of said channel around the periphery thereof, the angle of the mating taper between said attachment bars and said grooves being selected such that the fit between said bars and said grooves is maintained with changes in temperature without substantial stress of said lower end of said channel.

2. The channel-to-nozzle attachment of claim 1 including clearance between the faces of said bars and the bottoms of said grooves at a predetermined temperature for allowing said bars to move further into said grooves as temperature increases.

3. The channel-to-nozzle attachment of claim 1 wherein said angle of the mating taper A is determined according to the relationship:

$$\tan A/2 = \frac{W}{D}$$

where:

W is half the width of said grooves

D is half the width of said nozzle.

4. The channel-to-nozzle attachment of claim 1 wherein said nozzle has opposite sides and wherein the upper tapered surface of the groove on one side is in the same plane as the lower tapered surface of the groove on the opposite side.

5. The combination of claim 1 wherein said nozzle is formed of stainless steel and said channel and said attachment bars are formed of an alloy of zirconium.

6. In a nuclear fuel assembly including a plurality of fuel rods supported in spaced array upon a lower tie plate, a nozzle adjacent said lower tie plate for receiving a flow of coolant, a tubular flow channel surrounding said array for directing said coolant through said array of said fuel rods, the lower end of said flow channel surrounding the sides of said nozzle, said nozzle being formed of a material having a different thermal coefficient of expansion than the material of said channel, attachment means for affixing said lower end of said channel to said sides of said nozzle comprising: a plurality of grooves having tapered sides formed in said sides of said nozzle around the periphery thereof; a like plurality of attachment bars formed of a material having a thermal coefficient of expansion similar to that of said channel, each of said bars being fitted in a respective one of said grooves of said nozzle and being formed with tapered sides mated with the tapered sides of the respective groove; and means for securing said bars to the inside surfaces of the lower end of said channel around the periphery thereof, the angle of the mating taper between said attachment bars and said grooves being selected such that the fit between said bars and said grooves is maintained with changes in temperature without substantial stress of said lower end of said channel.

7. In a nuclear fuel assembly including a plurality of fuel rods supported in spaced array between a lower tie plate and an upper tie plate, a nozzle adjacent said lower tie plate for receiving a flow of coolant, an open-ended tubular flow channel surrounding said array, said channel being formed of a material having a different thermal coefficient of expansion than the material of said nozzle, and attachment means for affixing the lower end of said channel to said nozzle comprising: a plurality of tapered grooves formed in sides of said nozzle around the periphery thereof adjacent the lower end of said channel; a like plurality of similarly tapered attachment bars positioned in said grooves, said attachment bars being formed of a material having a thermal coefficient of expansion similar to that of the material of said channel; and means for securing said bars to the lower, inner end of said channel around the periphery thereof, the angle of taper of said grooves and said bars being selected such as to allow said bars to move more or less deeply into said grooves with changes in temperature without bending of the lower end of said channel.

* * * * *